Feb. 3, 1959 — A. W. SCHENKER — 2,871,573
ANGLE MEASURING INSTRUMENT
Filed March 7, 1956 — 3 Sheets-Sheet 1

INVENTOR.
ABRAHAM W. SCHENKER
BY Hane and Nydick
ATTORNEYS

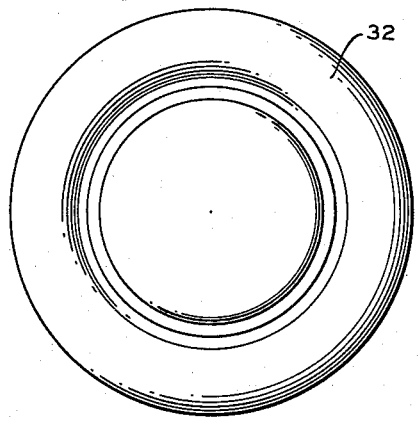
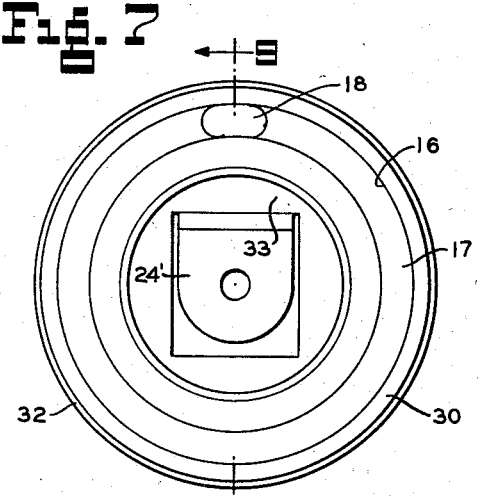
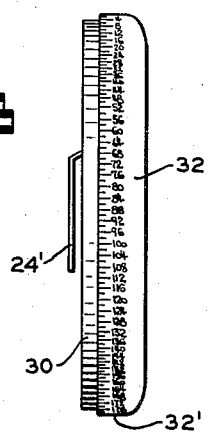
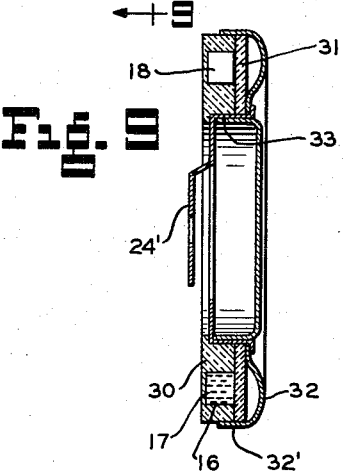
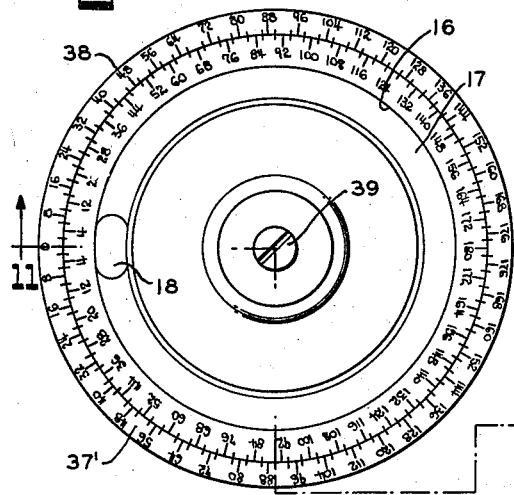
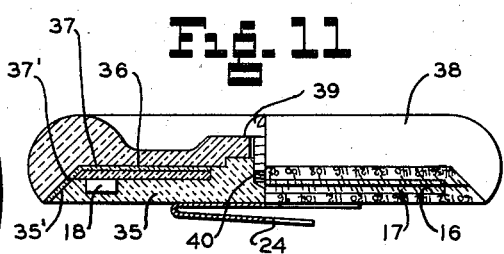

Feb. 3, 1959 A. W. SCHENKER 2,871,573
ANGLE MEASURING INSTRUMENT
Filed March 7, 1956 3 Sheets-Sheet 3

INVENTOR.
ABRAHAM W. SCHENKER
BY
Hause and Nydick
ATTORNEYS

2,871,573

United States Patent Office 2,871,573
Patented Feb. 3, 1959

2,871,573

ANGLE MEASURING INSTRUMENT

Abraham W. Schenker, New York, N. Y.

Application March 7, 1956, Serial No. 570,039

4 Claims. (Cl. 33—207)

The present invention relates to an angle measuring instrument, and more particularly to an angle measuring instrument for use in connection with physical rehabilitation of patients suffering from neuromuscular disorders.

Active exercise, that is, exercise performed by the patient is the accepted method of restoring the functional use of the involved limbs, the controlling nerves, muscles or joints which have been damaged or otherwise impaired by infantile paralysis or arthritis and other types of neuromuscular dysfunction. The purpose of such exercise is activation of the impaired muscles and re-establishment of their normal functions.

The volitional contraction of the impaired muscles and the resulting movement of the limb under treatment which the patient is capable of performing, are often very slight at least at the beginning of the treatment. In order to ascertain any progress that may have been made by the patient it is essential for the person directing the treatment to measure accurately, that is, within a very few degrees, the angle through which the patient is capable of moving the afflicted limb. An accurate measurement of the angular movements of a limb presents considerable difficulties due to the anatomy of the body. If for instance an arm is raised from the hanging-down position to the horizontal position, the arm is not necessarily turned through an angle of 90°. Human joints do not have a fixed pivot point such as the pivot point of two bars pivoted together, but experience a slight displacement of the pivot point during the raising or lowering of the limb. This displacement of the pivot point of the joint, which is variable and the extent of which is not readily ascertainable, will obviously falsify an angular measurement based upon raising of the arm from the hanging-down position presumed to represent a perpendicular position. Furthermore, the position of an arm hanging down is different for different persons as it is materially affected by the body build of the person to be measured. Similar problems arise with the measurements of the angular movements of all other limbs, as well as movements of the head, neck and trunk.

As far as the applicant who specializes in physical medicine and rehabilitation, is aware there is not available any device which permits the measurement of the angular movement of the various parts of the body with the accuracy desirable for the supervision of the treatment.

Accordingly, the principal object of the present invention is to provide a novel angle measurement device which permits conveniently and accurately to measure the angular movements of a limb.

Another object of the invention is to provide a novel angle measuring device by means of which the angular movement of a limb from any initial position into any end position can be accurately measured.

Still another object of the invention is to provide a novel angle measuring device which does not require the installation of any cumbersome equipment, but is directly attachable to the respective limb, and which is so compact and light that it does not appreciably affect the residual volitional movement of which the patient is capable.

A further object of the invention is to provide a novel angle measuring device which when attached to a limb automatically produces the correct indication of the angular movement of the limb.

Other and further objects, features and advantages of the invention will be pointed out hereinafter and set forth in the appended claims forming part of the application.

In the accompanying drawing several preferred embodiments of the invention are shown by way of illustration and not by way of limitation.

In the drawing:

Fig. 6 shows a rear view of Fig. 3.

Fig. 7 is a plan view of a modification of the measuring device.

Fig. 8 is a side view of Fig. 7.

Fig. 9 is a section taken on line 9—9 of Fig. 7.

Fig. 10 is a plan view of another modification of the measuring device.

Fig. 11 shows a section taken on line 11—11 of Fig. 10 and a side view of Fig. 10.

Figure 1:
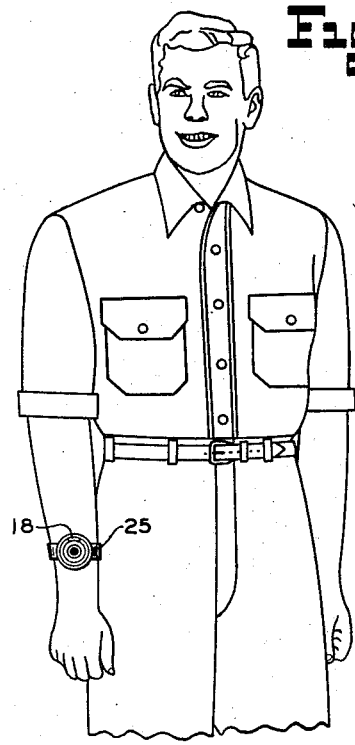
Fig. 1 is a view of a person having an angle measuring device according to the invention attached to his right arm.

Referring now to Figs. 1 through 6 in detail, the angle measuring device exemplified in these figures comprises a circular disc 15 made of any suitable material such as plastic. In one side of this disc an annular groove 16 is formed filled with a suitable preferably colored liquid 17 except for a space sufficient to form an air bubble 18. The circumferential ends of the bubble will automatically assume the meniscus shape shown in Fig. 3. The side of disc 15 including the liquid filled groove 16 is covered with a transparent disc 19 made for instance of plastic. A second transparent disc 20 is placed upon disc 19. Disc 20 constitutes the scale member of the device and is calibrated in degrees of angle, the calibration running from 0° to 180° in both directions. It is of course also possible to provide the calibration directly on disc 19 in which event this disc serves as both, the closure disc and the scale member.

Figure 3:
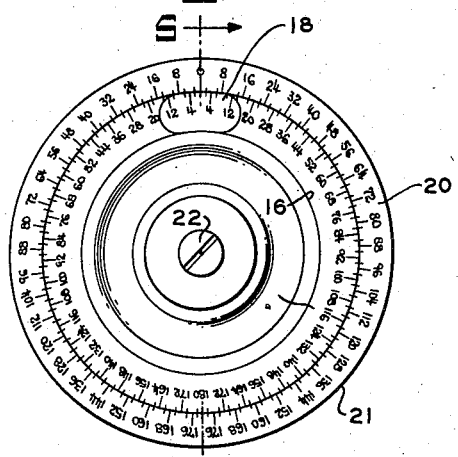
Fig. 3 is a front or plan view of the measuring device.
Figure 4:
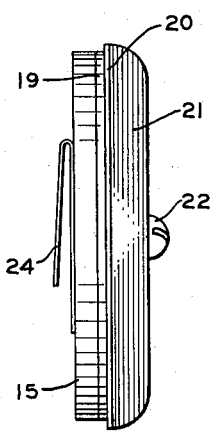
Fig. 4 is a side view.
Figure 5:
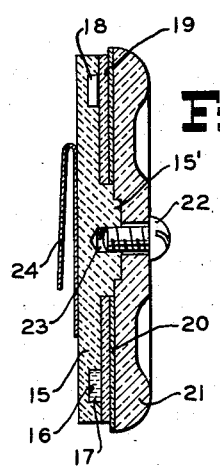
Fig. 5 is a sectional view taken on line 5—5 of Fig. 3.

Figs. 3, 4 and 5 show the device at a size which is suitable for the actual instrument. As at this size the calibration on the scale member becomes rather crowded, the degree markings are preferably arranged in two circles as is shown in Fig. 3. To further facilitate the reading of the scale a magnifying lens disc 21 is preferably provided. The lens may also be made of plastic.

The aforedescribed components of the measuring device may be joined by any suitable means which permit a rotational adjustment of the bubble 18 relative to the scale on disc 20. There is shown by way of example a screw 22 which penetrates lens disc 21 and is screwed into a threaded hole 23 provided in disc 15. Closure disc 19 and scale disc 20 are held in position by a suitably shouldered boss 15' protruding from disc 15.

To attach the instrument to the limb of a person suitable fastening means shown as a metal or plastic hook 24 are secured to the rear side of disc 15. This hook may be conveniently slipped upon a soft strap 25 attached to the respective limb of the person as is shown in Figs. 1 and 2.

Figure 2:
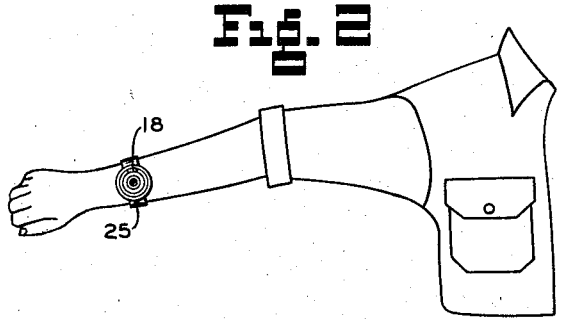
Fig. 2 shows the right arm of the person of Fig. 1 in raised position.

The operation of the measuring device as hereinbefore described, is as follows:

The instrument is attached to the limb the angular movements of which are to be measured, say to the right arm of a person as is shown in Figs. 1 and 2. The arm is thereupon moved into its starting position such as the relaxed hanging-down position of Fig. 1 and the scale disc 20 is so adjusted that one of the menisci is in alignment with the zero marking. When the patient thereupon raises his arm for instance, into the position shown in Fig. 2, a reading of the position of the same meniscus will correctly indicate the angular movement which the instrument has experienced as a result of the raising of the arm. As is apparent, successive indications of the instrument afford a true comparison of the angular movements of which the patient is capable.

In the embodiment of the invention heretofore described, the scale is read on the respective face of the instrument.

Figs. 7, 8 and 9 shows an arrangement which provides for reading of the scale on the periphery of the instrument. To this end, a transparent ring 30 made for instance of plastic is provided in which again is formed an annular groove 16 filled with colored liquid 17 so as to leave space for air bubble 18. Groove 16 is closed by a transparent disc 31 made for instance of plastic upon which is fitted a ring 32 having a peripheral flange 32' partly overlying the periphery of ring 30 so that bubble 18 is visible by looking upon the periphery of disc 30 and flange 32' as can best be seen in Fig. 9. The discs are held in position by any suitable means such as a metal insert 33 which is extended to form an attachment hook 24'. The hook may of course also be formed by a part secured to insert 33.

The operation of the device according to Figs. 7, 8 and 9 is apparent from the previous description. It suffices to state that discs 30 and 32 are rotated relative to each other so that one of the menisci of bubble 18 is in alignment with the zero marking of the scale at the beginning of a measuring operation.

Figs. 10 and 11 show an embodiment of the invention comprising a transparent disc 35 having a slanted peripheral edge 35'. This disc includes in one of its sides the liquid filled groove in which bubble 18 is freely movable. Disc 35 is covered with a transparent disc 36 upon which is fitted a scale disc 37 having a slanted peripheral flange 37' overlying the slanted edge 35'. The slanted flange 37' bears the calibration as is shown in Fig. 10. As is apparent, the position of the bubble may be observed through the calibrated flange 37'. As described in connection with Figs. 3, 4 and 5 closure disc 36 and scale disc 37 may be combined into a single disc.

To facilitate reading of the rather crowded calibrations a lens disc 38 similar to lens disc 21 may be provided.

The discs of the device are joined by any suitable means, a screw 39 screwed into a threaded bore 40 of disc 35 is shown. Discs 36 and 37 are located in position by a shouldered boss protruding from disc 35 as has been described in connection with Figs. 3, 4 and 5.

The operation of the device according to Figs. 10 and 11 is obvious from the previous description. It suffices to state that the readings are observed through magnifying lens 38.

Figure 12:
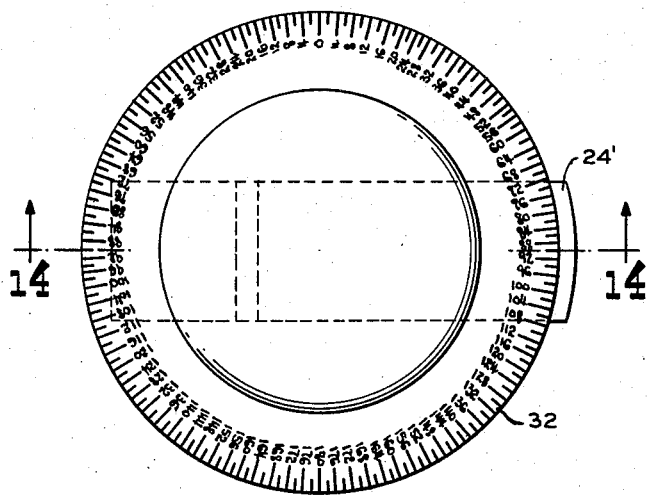
Fig. 12 is a plan view of a further modification of the measuring device.
Figure 13:
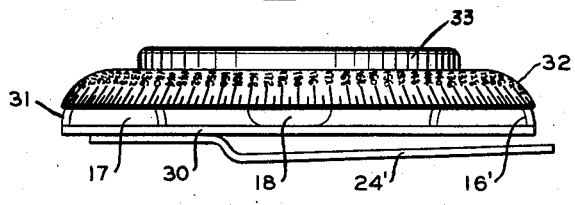
Fig. 13 is a side view of Fig. 12.
Figure 14:
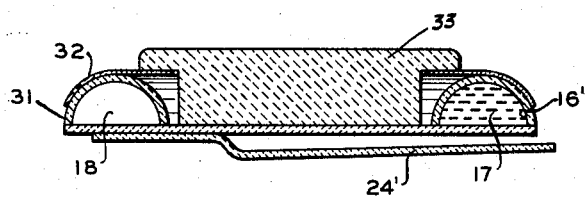
Fig. 14 is a section taken on line 14—14 of Fig. 12.

The angle measuring device according to Figs. 12, 13 and 14 comprises a base plate 30 to which is secured with its open side a transparent ring 31 of rounded, preferably semi-circular cross-section. This ring forms an annular groove 16' which is filled with liquid 17 including air bubble 18. A scale disc 32 calibrated in degrees of angle as can best be seen in Fig. 12, is placed upon the closed side of ring 31 so as to leave an annular gap between disc 32 and plate 30. The ring is held in position by any suitable fastening means shown as a headed pivot block 33. The block permits rotation of disc 32 relative to ring 31 for correlating the position of the bubble and the scale by looking edgewise upon said gap. A hook or bracket 24' secured to base plate 30 for instance, by cementing serves to attach the measuring device to arm strap 25.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An angle measuring instrument for use in connection with physical rehabilitation treatment, said instrument comprising a circular base plate, a transparent ring of semi-circular cross-section placed with its open side upon said base plate to form a closed annular channel, a liquid filling said circular channel except for a gaseous bubble freely movable in the channel, a cover disc disposed upon the closed side of the ring concentric therewith and the base plate so as to leave an annular gap between the disc and the plate, and fastening means joining the base plate, the ring and the cover disc, said fastening means permitting rotation of the disc relative to the ring, and said disc having thereon a peripheral scale calibrated in degrees disposed in juxtaposition with said gap for indicating the position of the bubble relative to the scale.

2. An instrument according to claim 1, wherein said fastening means comprise a headed pivot block secured to said base plate and extending through an opening in said cover disc.

3. An instrument according to claim 1 and further comprising an attachment member secured to the outside of said base plate.

4. An angle measuring instrument for use in connection with physical rehabilitation treatment, said instrument comprising a circular base plate, a transparent semi-toroidal hollow ring placed with its open side upon said base plate to form a closed annular channel, a fluid filling said circular channel including a liquid and a gaseous bubble suspended therein for free movement within said channel, and inverted saucer shaped cover disc having a circular central opening supported upon the closed side of said ring concentric therewith and said base plate, said cover disc partially encircling said ring and having peripheral edges extending toward and spaced from said base plate, fastening means secured to said base plate and rotatably supporting said disc relative to said ring, and said disc having a peripheral scale calibrated in degrees disposed upon said disc for indicating various positions of said bubble, said fastening means comprising a pivot block having a base secured to said base plate and an enlarged head overlying and in sliding engagement with said cover disc.

References Cited in the file of this patent

UNITED STATES PATENTS

| | | |
|---|---|---|
| 334,052 | Reid | Jan. 12, 1886 |
| 808,372 | Hunter et al. | Dec. 26, 1905 |
| 1,401,146 | Falconer | Dec. 27, 1921 |
| 2,008,481 | Weber | July 16, 1935 |
| 2,527,961 | Rantz | Oct. 31, 1950 |
| 2,568,143 | Casper | Sept. 18, 1951 |
| 2,636,283 | Dinstman | Apr. 28, 1953 |